United States Patent [19]

Vulikh et al.

[11] 4,157,376

[45] Jun. 5, 1979

[54] PROCESS FOR PURIFICATION OF GASES

[76] Inventors: Alexandr I. Vulikh; Maina K. Zagorskaya, both of ulitsa Firsova, 2, kv. 64; Natalia A. Fokina, Kasimovskoe shosse, 17a, kv. 4; Gennady A. Nikandrov, ulitsa Firsova, 2, kv. 10; Lidia A. Reznichenko, ulitsa Sovetskoi Armii, 17, korpus 2, kv. 11, all of Ryazan; Mikhail P. Zverev, ulitsa Novatorov, 18, korpus 2, kv. 24; Arkady N. Barash, Graivoronovsakaya ulitsa, 16, korpus, 4, kv. 53, both of Moscow; Valentina I. Surkova, ulitsa Tsiolkovskogo, 21/20, kv. 20, Kaliningrad Moskovskoi oblasti; Alexei M. Mavrin, ulitsa Sovetskaya, 7, kv. 10; Nikolai V. Troyan, ulitsa Kultury, 10, kv. 10, both of Polevskoi Sverdlovskoi oblasti; Nadezhda F. Kalyanova, ulitsa Lenina, 12, kv. 25, Schelkovo Moskovskoi oblasti; Ivan G. Shimko, ulitsa Rudnevoi, 4/13, kv. 24, Moskow; Alexandr A. Alovyainikov, ulitsa Firsova, 2, kv. 10, Ryazan; Lev I. Pechalin, ulitsa Pervomaiskaya, 21, kv. 5, Mytischi Moskovskoi oblasti, all of U.S.S.R.

[21] Appl. No.: 839,346

[22] Filed: Oct. 4, 1977

[51] Int. Cl.$^2$ .................................................. B01D 53/34
[52] U.S. Cl. ................................... 423/240; 423/483; 423/488; 55/71
[58] Field of Search ............... 423/240, 241, 481, 483, 423/488; 55/71

[56] References Cited

U.S. PATENT DOCUMENTS

| 2,829,028 | 4/1958 | Aho et al. ............................ 423/240 |
| 3,653,811 | 4/1972 | Zagorskaya et al. ................ 423/240 |
| 4,056,605 | 11/1977 | Vulikh et al. ........................ 423/488 |

Primary Examiner—Earl C. Thomas
Attorney, Agent, or Firm—Lackenbach, Lilling & Siegel

[57] ABSTRACT

A process for the removal of hydrogen fluoride and/or hydrogen chloride from gases comprising passing the gas to be purified through anion-exchange sorbent composed of a textured chemisorption fiber based on carbochain polymers with vinylpyridine groups or aliphatic amino groups. On exhaustion the sorbent is regenerated with water.

The process of the present invention makes it possible to purify gases substantially completely irrespective of the initial concentrations of impurities in the gas being treated and ensures practically unlimited number of sorption-regeneration cycles with the same sorbent.

5 Claims, No Drawings

PROCESS FOR PURIFICATION OF GASES

The present invention relates to processes for the removal of contaminants contained in gases, and more specifically, of hydrogen fluoride and/or hydrogen chloride impurities.

Hydrogen fluoride and hydrogen chloride are most common air pollutants resulting from chemical and metallurgical industries. Thus, a great quantity of fluorine-containing gases are evolved, having hydrogen fluoride as the main component, in the production of phosphoric fertilizers, aluminum, hydrogen fluoride, hydrofluoric acid, fluorine, metal fluorides, fluoroorganic and other fluorine-containing compounds.

Large amounts of hydrogen chloride are evolved upon chlorination of organic compounds, sulphochlorination of hydrocarbons and in certain technological processes of inorganic chemistry, such as in hydrolysis of magnesium chlorideto magnesia; in conversion of chlorides to nitrates by nitric acid; during processing of potassium chloride and polymineral potassium ores to chlorine-free fertilizers. Hydrogen chloride is also liberated in various metallurgical processes, wherein nickel-copper, tin, and other ores are subjected to chlorination in the presence of steam. Off-gases containing both hydrogen chloride and hydrogen fluoride are formed in the production of chlorofluorohydrocarbons employed as cooling agents, in the thermal treatment of ores of non-ferrous metals including fluorine- and chlorine-containing materials.

Hydrogen fluoride and hydrogen chloride are toxic, corrosive to equipment, and detrimental to the environment. On the other hand, they are valuable chemical products, widely used in various industries. For this reason, there substances should be recovered completely from the flow of off gases, and utilized efficiently.

Owing to a high solubility of HF and HCl in water at high initial concentrations of these compounds in gases (from grams to hundreds of grams in one m$^3$ of a gas), the major portion of these substances can be effectively recovered by absorption methods. These methods, however, are inadequate for hygienic purification of gases, when the initial concentration of HF and HCl are milligrams to hundreds of milligrams in one m$^3$ of the gas.

Aqueous absorption of hydrogen fluoride from such gases is limited by high equilibrium vapor tension of HF over the solution of the resulting acid, thus hindering deep purification of the gas and obtaining the acid of such a concentration which would enable its economically efficient utilization. Furthermore, mists of acids are formed in the presence of steam, which are unsatisfactorily absorbed by water. This phenomenon makes it impossible to achieve complete removal of HF and HCl from gases even upon using for absorption aqueous solutions of chemical reagents, such as fluorides of alkali metals, ammonium carbonate, calcium chloride. Therefore, the main disadvantages of absorption methods for the removal of HF and HCl from gases at low concentrations of these compounds are great volumes of waste waters which should be additionally neutralized, as well as insufficient purification degree. These methods make it possible to lower concentrations of HF and HCl merely to 20–30 mg/m$^3$. Further lowering of concentrations of off gases can be achieved only through the use of adsorption methods. Other disadvantages of the absorption methods for the removal of HF and HCl from gases reside in the necessity of using rather expensive corrosion-resistant materials for the process equipment, and in relatively high air drag of the apparatus.

Adsorption methods for the removal of HF and HCl from air can be conducted with granulated sorbents. In all cases the maximal depth of purification is achieved with the help of materials capable of adsorbing these compounds by chemisorption mechanism. Physical-action sorbents such as active carbons at low concentrations of HF and HCl possess but a low capacity, while at high concentrations they feature no advantages over absorption methods. In addition to a high depth of purification, the main advantage of the chemisorption methods for the removal of HF and HCl from gases resides in the possibility of elimination and substantial minimization of waste waters which are inherent in the absorption methods. The majority of technical solutions relating to chemisorption methods are developed for hydrogen fluoride in view of its higher toxicity and lower efficiency of absorption methods for the removal of HF from gases in comparison with those for the removal of HCl. Chemisorption methods of HCl absorption are employed but rarely, mainly in combination with absorption methods.

Fluorides, oxides, hydroxides, carbonates, chlorides, sulphides and other inorganic metal compounds of metals can be used as sorbent for HF.

It is advisable to employ metal fluorides for purification of off gases and process gases, if they have a considerable content of hydrogen fluoride in them. The use of fluorides is based on the formation in its reaction with hydrogen fluoride of acidic fluorides (hydrofluorides) of the type MeF$_m$.nHF. Hydrogen fluoride which can be condensed and recycled into the process is evolved in thermal decomposition of hydrofluorides.

The choice of fluorides for the sorption of hydrogen fluoride is determined by numerous factors, among the most important are thermal stability of acidic fluorides, possibility of decomposition thereof at moderate temperatures with a view to desorbing HF and repeated use of the sorbent in a sorption-desorption cycle, as well as cost of the flourides employed.

For the sanitary purification of gases with low HF content, oxides, hydroxides and carbonates of metals are generally used. The reaction of HF therewith proceeds, as a rule, irreversibly and under optimal conditions it is possible to provide for a quantitative HF recovery from the off gases. The resulting fluorides in certain cases can be processed for the utilization of fluorine.

Known in the art are methods for HF sorption on Al$_2$O$_3$ in the form of activated or finely-divided alumina. The sorbent can be used directly in the apparatus in a granulated form or sprayed on a filter cloth. These methods ensure the degree of HF sorption of up to 99%, though it strongly depends on the system parameters such as particle size and surface area, gas humidity, flow rate of the gas. To maintain stable characteristics of purification special control measures should be taken.

Common to all the currently employed adsorption methods for the removal of HF from gases are the following disadvantages: considerable dependence of the purification degree on the system parameters, where high relative humidity of air has an extremely detrimental effect on the extent of purification, so that optimal temperatures of these methods generally exceed 100°

C.; impossibility, as a rule, of repeated use of the sorbents; high resistance of the filter bed of granulated sorbents to the gas flow being purified, decreasing the productivity of commercial apparatus and presenting difficulties in their maintenance.

Also known in the art is another method for the removal of hydrogen halides from gases, which method contemplates the use of synthetic ion-exchange resins and, first of all, granular anion exchanges.

Hydrogen fluoride and hydrogen chloride are effectively sorbed from humid air by anion exchanges in the hydroxyl form thereof according to the scheme:

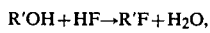

$$R'OH + HF \rightarrow R'F + H_2O,$$

wherein R' is a polymeric matrix of the anion exchangers. The sorbent is further subjected to alkaline regeneration. In the reaction an alkaline solution of the halide is obtained; it is preferable to use weakly basic anion exchangers which have more favorable characteristics for the conversion thereof into the basic form. It is more advantageous, though, to employ strongly basic anion exchangers in the same salt form, i.e. in the fluoride or chloride form according to the scheme:

$$R'F + nHF \rightarrow R'F.nHF$$

followed by aqueous regeneration of the sorbent. In this case, at a comparable degree of purification and a somewhat lower dynamic activity of the anion exchangers in respect of HF, regeneration of the anion exchangers is substantially simplified and the eluate comprises a substantially pure solution of a corresponding acid.

Principal advantages of the ion-exchange method of sorption of hydrogen fluoride and hydrogen chloride, especially for the purposes of the sanitary purification of air, as compared to the other adsorption methods, reside in the following:

(1) high degree of recovery approaching 100%;

(2) high specific capacity of ion-exchange sorbents (about 20% by weight) and low dependence thereof on the concentration of hydrogen halides and other process parameters;

(3) presence of humidity in the air favors efficient purification, so that the recovered hydrogen fluoride and hydrogen chloride might be present in the gas flow being treated in both gaseous and mist-like state;

(4) high chemical stability of ion exchangers and applicability of simple and effective regeneration methods make it possible to use said ion exchangers repeatedly for sorption of hydrogen fluoride and hydrogen chloride without any noticeable diminution of sorption characteristics.

(5) possibility of simple utilization of the eluate owing to a sufficiently high concentration of HF therein.

The main disadvantage of these methods for purification of off gases restricting wide industrial use of ion exchangers for such purposes is that the rate of a bead diffusion controlled, reaction of usual granulated ionites with gases causes the use of deep beds of the sorbent. This factor contradicts the requirement of a high specific output of the filter, since increasing bed depth results in a sharply increased bed resistance to the gas flow.

It is an object of the present invention to provide such a process for the removal of hydrogen fluoride and/or hydrogen chloride from gases, which would make it possible to considerably increase the rate of sorption of hydrogen halides from a gas flow and lower the value of air drag of the sorbent bed, while retaining its high sorption capacity, chemical stability and mechanical strength.

These and other objects of the present invention are accomplished by the provision of a process which comprises passing the gas to be purified through an anion-exchange sorbent, followed by aqueous regeneration of the sorbent, wherein, according to the present invention, as the anion-exchange sorbent a textured chemisorption fiber based on carbo-chain polymers with vinylpyridine groups or aliphatic amino groups is used.

The origin of the gas to be purified containing hydrogen fluoride and/or hydrogen chloride has practically no influence on the purification efficiency in the process according to the present invention. These gases can be, for example, off gases pre-treated by absorption methods or exhaust ventilation air from the above-mentioned industrial processes. A possible limitation to the process according to the present invention might be high dust content in the gases being purified, which lowers the efficiency of repeated use of the anion-exchange fiber due to accumulation of dust on the filter; however, in case of water or acidsoluble dusts this limitation is of no importance.

With decreasing humidity of the gas flow being treated, the sorption capacity of the fiber is somewhat lowered but still remains practically suitable up to a relative humidity of 30%.

The temperature of the gas flow being treated is not critical.

The textured chemisorptional fiber as employed in the process according to the present invention can be used directly as a filter packing in the form of fiber, mats, nonwovens and fabrics; however, most efficient is the use of the fiber in the form of needle-pierced nonwovens having a uniform structure and such specific features as flexibility, strength, density, which offer strong possibilities for developing highly-effective, light-weight and simple sorption-filtering materials. Such nonwovens may have a thickness of up to 20 mm and weight of 1 $m^2$ of up to 2 kg. Air drag of the nonwoven cloth at the gas flow rate of 1 cm/sec and bed thickness of 1 cm is less than 1 mm $H_2O$.

Specific sorption capacity of said fibers with respect to hydrogen fluoride and hydrogen chloride depends on the initial concentration of said compounds in the gses to be purified and is equal to about 20% by weight. Owing to a rather high rate of sorption of hydrogen halides by the sorbent according to the present invention, said capacity under dynamic conditions comprises substantially the capacity before breakthrough a layer of the nonwoven cloth with the weight of 1 $m^2$ of 1 kg and more at a gas flowrate of up to 10 m/sec.

Exhausted anion-exchange fibers are regenerated with water to obtain solutions of corresponding acids in the eluate, which in many cases can be collected and utilized in commercial production processes.

Regenerated fibers under similar sorption conditions are capable of repeatedly sorbing HF and HCl up to the above-mentioned values of their weight capacity. If the initial sorbent is a fiber in a basic form, its capacity in the first cycle is higher than in the subsequent cycles due to neutralization of functional groups. The sorption-aqueous regeneration cycle can be repeated hundreds of times till complete mechanical wear of the cloth.

The textured chemisorption fibers according to the present invention are based on carbo-chain polymer fibers based on a copolymer consisting of 50 to 80% by weight of acrylonitrile and 50 to 20% by weight of 2-vinylpyridine, 4-vinylpyridine or 2-methyl-5-vinylpyridine. Fibers consisting of 20 to 50% by weight of polyvinylidene chloride, polyvinylidene fluoride or polyvinyl chloride and 80 to 50% by weight of poly-2-vinylpyridine, poly-4-vinylpyridine or poly-2-methyl-5-vinylpyridine can also be used. Said fibers based on halide-containing polymers and polymers of the pyridine series have higher chemical stability than fibers based on copolymers of acrylonitrile. Sufficiently high chemical stability is also displayed by fibers based on a copolymer consisting of 20 to 50% by weight of polyproylene and 80 to 50% by weight of 2-vinylpyridine, 4-vinylpyridine or 2-methyl-5-vinylpyridine, which fibers can also be used as sorbents. The textured chemisorption fibres according to the present invention are fibers based on carbo-chain polymers with aliphatic amino groups, namely the fiber containing 20 to 60% by weight of polyethylene polyamine or polyethylene imine and 80 to 40% of polyvinylidene chloride, polyvinylidene fluoride, polyvinyl chloride or a copolymer of vinylidene fluoride with tetrafluoroethylene can be also used. The content of the ionogen polymer, i.e., a polymer with chemically active functional groups, in the chemisorption fiber below 20% by weight results in a decreased exchange capacity of the sorbent and makes its use inexpedient. Increasing the content of said ionogen polymer in the fiber above 50–60% by weight results in a decreased mechanical strength of the fiber and complicated technology for its manufacture and textile processing.

The process for the removal of hydrogen fluoride and/or hydrogen chloride from gases in accordance with the present invention makes it possible:

to purify gases practically totally (down to minimal analytically determined concentrations) irrespective of the initial concentrations, which usually corresponds to a purification degree of at least 99%;

to obtain sufficiently high specific capacity of the sorbents even at low concentrations of hydrogen halides in the gases to be purified;

to ensure high effectiveness of gas purification within a wide range of parameters of the purified gases—at a humidity within the range of from 30 to 100% (as well as in the presence of aerosols of acid solutions in gases) and at temperatures from negative to about 60° C.;

to carry out practically unlimited number of sorption-regeneration cycles on the same filter;

to perform less expensive aqueous regeneration of filters with the formation of solutions of hydrogen halide acids which may be utilized in numerous cases;

to use filters with an extremely low (below 10 mm $H_2O$) air drag with a high output per unit volume, thus making it possible to build such filters into working ventilation systems without any noticeable diminution of the air flow.

The process for the removal of hydrogen fluoride and/or hydrogen chloride from gases according to the present invention is technologically simple and can be performed in the following manner.

Chemisorption fibers are manufactured by conventional methods from carbo-chain polymers or copolymers, wherein one of the monomers contains active groups capable of ion exchange.

The process for producing chemisorption fibers from copolymers of acrylonitrile and vinylpyridines comprises the following principal steps: copolymerization performed by the "solution" or "suspension" methods, shaping of fibers from the resulting copolymer and texturing by means of bifunctional compounds ensuring repeated use of the fibers in the ion exchange processes. As the starting monomers use can be made, for example, of acrylonitrile and vinyl monomers of the pyridine series: 2-methyl-5-vinylpyridine, 4-vinylpyridine, 2-vinylpyridine. The content of the latter compounds in the polymer is varied within a wide range, i.e. from 20 to 50% by weight. As the solvent for the "solution" copolymerization aprotic organic solvents such as dimethylsulphoxide, dimethylformamide, dimethylacetamide, and the like are used. As the texturing agents epoxy oligomers which upon heat treatment, form chemical bonds with vinylpyridine ensuring the formation of a three-dimensional structure of the fibers are used, as well as hydrazine hydrate, peroxide compounds, and epichlorohydrin. Ion-exchange fibers are produced by a "dry" or "wet" process comprising the following steps: shaping of fibers, directed drawing thereof, texturing, finish, crimping, and cutting.

Chemisorption fibers based on halide-containing polymers are manufactured by way of amination thereof with aqueous solutions of polyethylene polyamine or polyethylene imine. Said fibers are also produced by shaping thereof from a mixture of polymer in a common solvent. Suitable solvents for a halide-containing polzmer and polyvinylpyridine or polyamine are polar aprotic solvents such as dimethylformamide, dimethylsulphoxide, and the like. The texturing agent is introduced into the solution or added into the spinning bath. Suitable halide-containing polymers are polyvinylidene chloride, polyvinyl chloride, chlorinated polyvinyl chloride, polyvinylidene fluoride or a copolymer of vinylidene fluoride with tetrafluoroethylene.

If chemisorption fibers are produced from polypropylene, grafting of polyvinylpyridines onto the final fibers or fabrics can be performed, using the method of chemical initiation of polymerization. The polymerization can be performed in aqueous media.

The process for the removal of hydrogen fluoride and/or hydrogen chloride from gases according to the present invention is realized in the following manner.

The gases to be purified are passed through a filter containing a bed of anion-exchange fibers either in the form of filter packing or in the form of a textile material, preferably a nonwoven. The filter may be of any design corresponding to the physical shape of the material employed. While flowing through the sorbent bed placed in the filter, the gas is freed from impurities of HF and or HCl in both gaseous form and in the form of acids present in the form of aerosols. The purification of gases lasts until HF and/or HCl appear in the purified gas (usually, the break is noticed at the level of hygienic threshold limit values).

After saturation of the filter (breakthrough of HF and/or HCl), the sorbent bed is washed with water, the amount of which can be predetermined for the given filter and usually ranges from 2 to 20 volumes per volume of the sorbent.

Steps of gas purification and aqueous regeneration form a cycle, upon completion whereof the filter is again employed for purification of gases.

For a better understanding of the present invention some specific examples are given hereinbelow by way of illustration.

EXAMPLE 1

Into a vessel provided with a stirrer and a reflux condenser a reaction mixture is charged containing the following components in the hereinbelow-given proportions, parts by weight:
acrylonitrile: 80
2-methyl-5-vinylpyridine: 20
desalinated water: 1,700
azobisisobutyronitrile: 0.2

The reaction vessel is placed into a temperature-controlled water bath. Polymerization of the monomers in conducted at 60° C., pH of 2.5 and under stirring for the period of 2 hours. The degree of conversion of the copolymer is 55 to 60%. The content of 2-methyl-5-vinyl-pyridine in the copolymer is 35% by weight. Intrinsic viscosity [$\eta$] of the copolymer in dimethylformamide at 25° C. is equal to 1.5. The thus-prepared copolymer is precipitated by means of an alkali solution, washed with ethanol to remove the unreacted monomers, and dried to constant weight at 70° C. The resulting copolymer is dissolved in dimethylformamide at the same temperature to give an 18% spinning solution. From this solution the fiber is formed into a spinning bath containing isopropanol through a spinneret having 100 openings with a diameter of 0.008 mm, whereafter the fiber is drawn in an atmosphere of steam by 4 times, and treated with a 8% aqueous solution of an epoxy oligomer prepared on the basis of diethylene glycol. The fiber is dried at 150° C. for 30 minutes. Exchange capacity of the fiber with respect to 0.1 N HCl measured under static conditions is equal to 2.4 mg.-equiv./g; linear density of the fiber is 0.3 tex; tenacity is 18 gf/tex; elongation is 20%.

From the thus-produced fiber a needle-pierceable non-woven cloth is manufactured with a weight of 500 grams per square meter and a thickness of 6 mm. Exhaust ventilation resulting in the production of hydrofluoric acid, containing 50 mg HF per $m^3$ having a temperature of 20° C. and relative humidity of 50% is passed through a filter composed of a layer of said cloth. The working surface area of the filter is 15 $cm^2$; weight of the fiber in the working section of the filter is 0.75 g.

The air is passed through the filter at the rate of 2 l/min (linear speed of the air through the filter is 2.2 cm/sec).

Air drag of the filter to the gas flow is 0.7 mm $H_2O$.

When traces of HF appeared in the purified air, (determination sensitivity is 0.5 mg HF/$m^3$) 1,360 l of air were passed through the filter and 68 mg of HF (9% by weight of the sorbent) sorbed. Until the moment of levelling off of HF concentrations in the initial and filtered air, 700 l of the air were additionally passed through the filter and 25 mg of HF (3% by weight of the sorbent) sorbed.

The filter was regenerated with 30 ml of water to give 60 mg of HF in the filtrate. When air having the same composition and temperature is passed repeatedly through the regenerated filter, (0.5 mg/$m^3$) 900 l of air pass before the breakthrough of HF.45 mg of HF (6% by weight of the sorbent) are sorbed.

Air drag at the same filtration rate of gas is about 1.5 mm $H_2O$ during the first minute of filtration and then lowers to 0.8 mm $H_2O$. After repeated regeneration of the filter with 30 ml of water, 45 mg of HF are obtained in the filtrate.

Afterwards, cycles removing HF from air and of aqueous regeneration can be repeated for an unlimited number of times with the same results. The degree of air purification prior to the breakthrough of HF is above 99%; special measurements show that the average degree of air purification is 99.8%.

EXAMPLE 2

Into a vessel provided with a stirrer and a reflux condenser, a reaction mixture is charged, consisting of the following components and proportions, in parts by weight:
acrylonitrile: 65
2-methyl-5-vinylpyridine: 35
desalinated water: 2,000
azobisisobutyronitrile: 0.2

The reaction vessel is placed into a temperature-controlled water bath. Polymerization of monomers is conducted at 60° C., pH of 2.5, under stirring for two hours. The degree of copolymer conversion is 65 to 70%. The content of 2-methyl-5-vinylpyridine in the copolymer is 50% by weight; [$\eta$] of the copolymer in dimethylformamide at 25° C. is 1.2. The resulting copolymer is precipitated with of an alkali solution, washed with ethanol to remove the unreacted monomers, and dried to constant weight at 70° C. Then the copolymer is dissolved in dimethylformamide at 70° C. to give a 20% spinning solution. From this solution fiber is formed by the process described in the foregoing Example 1. Exchange capacity of the fiber with respect to 0.1 N HCl as measured under static conditions is equal to 3.5 mg.—equiv./g. From the resultant fiber there a needle-pierceable nonwoven cloth with a weight of 1 kg per square meter and thickness of 12 mm was made.

Through a filter consisting of two layers of this cloth, air is passed containing 200 mg of HF per $m^3$ at a temperature of 25° C. and relative humidity of 60%. The working surface area of the filter is 15 $cm^2$, weight of the fiber in the working section of the filter is 3.0 g.

Air is passed through the filter at a rate of 4 l/min (4.4 cm/sec). Air drag of the filter is 5.4 mm $H_2O$.

Before the moment of detecting traces of HF in the purified air, 2.250 l of air were passed through the filter and 450 mg HF (15% by weight of the sorbent) sorbed. Before the levelling of HF concentrations in the initial and purified air 650 l of the air, were additionally passed and 90 mg HF (3% by weight of the sorbent) sorbed.

Regeneration is effected by means of washing the filter with 100 ml of water to give 380 mg of HF in the filtrate.

When repeated purification of air with the same parameters and under the same process conditions is carried out with the regenerated filter, before the break point of HF, 1,620 l of air are passed and 324 mg of HF (10.8% by weight of the sorbent) sorbed. When the filter is repeatedly regenerated 100 ml of water, 320 mg of HF are obtained in the filtrate.

During subsequent cycles of air purification and aqueous regeneration using the same filter, similar results are obtained. The degree of air purification is above 99.7%.

EXAMPLE 3

Under the conditions described in the foregoing Example 2, off gases from the production of cryolite containing 600 mg HF/$m^3$ in the form of gaseous hydrogen fluoride and an aerosol of hydrofluoric acid are purified; the off gas temperature is 30° C.

Before breakthrough of HF, 1,120 l of gas are passed through the filter and 670 mg (22% by weight of the sorbent) of HF sorbed. Upon regeneration with 100 ml of water 520 mg of HF are obtained in the filtrate. Air drag of the filter is 9 mm $H_2O$.

In subsequent cycles of purification of the same gases before HF breakthrough, 900 l of gas are passed through the filter and 540 mg of HF (18% by weight of the sorbent) sorbed and then washed with water. The degree of gas purification is above 99.9%.

EXAMPLE 4

Into a 250 cm$^3$ flask provided with a stirrer and a reflux condenser a reaction mixture is charged consisting of the following components, parts by weight:
acrylonitrile: 80
2-methyl-5-vinylpyridine: 20
desalinated water: 1,800
ammonium persulphate: 0.2

Polymerization of the monomers is conducted at 70° C. and pH=3 under stirring for 30 minutes.

The resulting copolymer is washed with ethanol to remove the unreacted monomers and dried to constant weight at 80° C. The copolymer yield is 80%, the content of 2-methyl-5-vinylpyridine in the copolymer is 20% by weight. [$\eta$] of the copolymer in dimethylformamide at 25° C. is 1.3.

Then the copolymer is dissolved in dimethylformamide at 80° C. to give a spinning solution with a concentration of 15% by weight. Afterwards, fiber is formed from this solution using a spinneret having 40 openings with a diameter of 0.08 mm into a spinning bath containing isopropanol. The fiber is drawn by 4.5 times in an atmosphere of steam. The drawn fibre is subjected to treatment with a 8% aqueous solution of an epoxy oligomer based on diethylene glycol and epichlorohydrin, and then heated in a drying cabinet at 150° C. for 10 minutes. Tenacity of the fiber is 18–20 gf/tex, elongation is 23–25%, linear density of the fiber is 0.3 tex. Exchange capacity of the fiber with respect to 0.1 N HCl under static conditions is 1.5 mg.-equiv./g.

A nonwoven needle-pierceable cloth is produced from this fiber with a weight of 1 kg per square meter and thickness of 11 mm.

Through a filter composed of three layers of this cloth, air containing 100 mg HF/m$^3$ at of 40° C. and a relative humidity of 70% is passed. Working area of the filter is 100 cm$^2$; weight of the fiber in the working section of the filter is 30 g.

Air is passed through the filter at a rate of 30 l/min (5 cm/sec). Air drag is 7 mm $H_2O$.

Before the HF breakthrough, 18 m$^3$ of air are passed and 1.8 g of HF (6% by weight of the sorbent) sorbed. After aqueous regeneration (using 0.6 l of water), on the regenerated filter under the same conditions, 1.2 g of HF (4% by weight of the sorbent) are purified. Similar results are obtained in subsequent purification cycles.

EXAMPLE 5

Into a 250 cm$^3$ flask provided with a stirrer and a reflux condenser a reaction mixture is charged consisting of 75 parts by weight of a solvent, i.e. dimethylsulphoxide, 15 parts by weight of acrylonitrile, 10 parts by weight of 4-vinylpyridine, and 0.15 part by weight of azodinitrile. The reaction mixture is heated to 70° C. and polymerization is conducted at this temperature for 90 minutes. The content of 4-vinylpyridine in the copolymer is 40% by weight. From the resulting solution a fiber is formed by the procedure similar to that described in the foregoing Example 1. The fiber is drawn by 4 times at a temperature of 180° C. The drawn fibre has the tenacity of 26 gf/tex, elongation of 22%. Exchange capacity of the fiber with respect to 0.1 N HCl is 2.4 mg.-equiv./g.

5.0 g of the resulting fiber is placed into a glass column with the diameter of 25 mm. The fibre bed height is 85 mm.

Through the column air is passed containing 50 mg HCl/m$^3$ at 60° C. and relative humidity of 60% at a rate of 3 l/min (10 cm/sec). Air drag of the fiber bed is 45 mm $H_2O$.

Before HCl breakthrough (5 mg/m$^3$) 17 m$^3$ of air are passed and 850 mg of HCl sorbed. After regeneration of the fiber with 100 ml of water, 460 mg of HCl are obtained in the filtrate. When repeated purification of air under the same conditions using the regenerated fiber was carried out, 9 m$^3$ of air were purified and 450 mg of HCl (9% by weight of the sorbent) sorbed. In subsequent cycles similar results are obtained. The degree of air purification is above 90%; the average degree of air purification before HCl breakthrough is 98%.

EXAMPLE 6

As the sorbent a fiber produced by the procedure described in the foregoing Example 5 is used except that it contains 40% by weight of 2-vinylpyridine in the resulting copolymer and has an exchange capacity with respect to 0.1 N HCl equal to 2.4 mg.-equiv./g.

HCl removal from air under the conditions described in Example 5 hereinabove gives the same results as in said Example.

EXAMPLE 7

As the sorbent a nonwoven needle-pierceable cloth (with a weight of 500 grams per 1 m$^2$) based on the fiber from a copolymer of acrylonitrile (65% by weight) and 2-methyl-5-vinylpyridine (35% by weight) prepared in a manner similar to that described in Example 1 hereinbefore is used.

HCl is removed from off gases from the absorption system in the production of hydrochloric acid, containing 120 mg HCl/m$^3$ at 30° C. and relative humidity of 90% under the conditions similar to those of Example 1 hereinbefore.

Prior to detecting traces of HCl in the purified air (the measurement sensitivity is 5 mg/m$^3$ HCl), through the filter 1,020 l of air are passed and 122 mm HCl (16% by weight of the sorbent) sorbed. Before levelling off of HCl concentrations in the initial and purified air 450 l of air are additionally passed and 29 mg HCl (4% by weight of the sorbent) sorbed.

The filter was regenerated with 30 ml of water to give 80 mg of HCl in the filtrate.

Upon repeated purification of air having the same composition and temperature by means of the regenerated filter before HCl breakthrough (5 mg/m$^3$), 470 l of air are passed and 56 mg of HCl (7.5% by weight of the sorbent) sorbed. Upon repeated regeneration of the filter with 30 ml of water 56 mg of HCl are obtained in the filtrate.

Subsequent cycles of HCl removal from air and of aqueous regeneration can be repeated for an unlimited number of times, while ensuring the same results. The degree of air purification is above 95%, and on the average, as shown by special measurements, it is equal to 99.5%.

EXAMPLE 8

Into a 1,000 cm$^3$ three-neck flask provided with a stirrer and a reflux condenser 900 ml of a 10% aqueous solution of 2-methyl-5-vinylpyridine are poured; pH=2. To the solution 0.2% (by weight of the solution) of ammonium persulphate is added. The reaction is conducted at a temperature of 60° C. for 5 hours. As a result, a polymer is obtained with a yield of 80-85% by weight. The polymer is precipitated with a 1.5% solution of caustic soda, washed with ethanol, and dried to constant weight.

30% by weight of the resulting poly-2-methyl-5-vinylpyridine and 70% by weight of polyvinylidene fluoride are dissolved in dimethylformamide to give a 15% spinning solution. The latter is added with 2% by weight (of the polymer) of an epoxydiodiane oligomer and a fiber is then formed. As the settling agent a mixture of water (90%) and dimethylformamide (10%) is used. The fiber is drawn in steam by 5 times at 100° C. and then in a hollow tube by 2 times at 160° C.

The resulting textured anion-exchange fiber has the exchange capacity under static conditions of 2.1 mg-equiv/g, tenacity of 24 gf/tex, elongation of 25%, linear density of 0.3 tex. From the resulting fiber a nonwoven needle-pierceable cloth is manufactured with the weight of 1 kg per 1 m$^2$ and a thickness of 10 mm.

Air is purified containing 120 mg HF/m$^3$ and 120 mg HCl/m$^3$ with a temperature of 25° C. and relative humidity of 70% on a filter with two layers of the fiber and the filtration working area of 15 cm$^2$. Weight of the working part of the filter is 3.0 g. The rate of gas filtration is 4 l/min (4.4 cm/sec). Air drag of the filter is 6 mm H$_2$O.

Before the point of HF break (0.5 mg/m$^3$) 1,480 l of the gas are passed through the filter (no penetration of HCl is detected). 178 mg of HF and 180 mg of HCl are sorbed. Upon washing of the filter with 100 ml of water, 160 mg of HF and 60 mg of HCl are obtained in the filtrate. Upon repeated purification of air with the regenerated filter under the same conditions before the HF break through, 950 l of the air are purified and in subsequent cycles the same results are obtained.

EXAMPLE 9

200 g of polypropylene are oxidized with air oxygen at 100° C. After 60 hours of oxidation the fiber contains 0.016% by weight of hydroperoxide groups. Thereafter, the fiber is placed into a glass vessel containing 4 l of water, 5 g of FeSO$_4$.7H$_2$O, and 200 ml of 2-methyl-5-vinylpyridine. The polymerization reaction is conducted at 70° C. for 2 hours, whereafter the fiber is washed with acetone and dried. The fiber contains 50% by weight of poly-2-methyl-5-vinylpyridine and has an exchange capacity with respect to 0.1 N HCl of 3.4 mg.-equiv./g.

5.0 g of the fiber are placed into a column made of organic glass with a diameter of 25 mm. The fiber bed height is 90 mm.

Through the column air is passed, containing 30 mg HF/m$^3$ at a temperature of 15° C. and relative humidity of 80% at the rate of 3 l/min (10 cm/sec). Air drag of the fibre bed is 40 mm of water column.

Before HF breakthrough 24 m$^3$ of air are passed and 720 mg of HF sorbed. When regenerating the fiber with 100 ml of water 410 mg of HF are washed out. In the subsequent cycles under the same conditions, in each cycle, 13-14 m$^3$ of air are purified, thus sorbing about 400 mg of hydrogen fluoride.

EXAMPLE 10

A fiber is formed from an 18% solution of polyvinylidene fluoride in dimethylformamide. In the spinning solution polyethylene polyamine in an amount of 30% by weight of the polymer is added. As the settling agent use is made of water containing 5% of polyethylene polyamine. The resulting fiber, after the shaping is drawn at a temperature of 140° C. by four times, washed, and dried. The fiber contains 20% by weight of polyethylene polyamine and has an exchange capacity under static conditions of 1.5 mg.-equiv./g with respect to 0.1 N HCl; tenacity of 20 kg/mm$^2$, elongation of 20 to 25%. The fiber is resistant to acids and alkali; it does not change its exchange capacity upon repeated regeneration; linear density of the fiber is 0.8 tex. From the thus-manufactured fiber a nonwoven needle-pierceable cloth is produced with a weight of 1 kg per 1 m$^2$ and a thickness of 10 mm.

During purification of air under the conditions of Example 2 before HF breakthrough 1,100 l of air are passed and 220 mg of hydrogen fluoride sorbed. Regenerating the filter with 100 ml of water, 135 mg of HF are obtained in the filtrate. In the subsequent cycles with the same filter about 700 l of air are purified and 130-140 mg of HF sorbed.

EXAMPLE 11

The fiber formed from a 25% solution of chlorinated polyvinyl chloride in acetone by the "dry" method (air temperature in the shaft is 50° C.) is subjected after stretching to treatment with a 80% aqueous solution of polyethylene polyamine at 70° C. for 30 minutes. From the resulting fiber, after washing thereof with desalted water, drying, crimping, and cutting, by the needle-piercing method, a nonwoven material is made which contains 50% by weight of polyethylene polyamine and has an exchange capacity, relative to 0.1 N HCl, of 3.5 mg.-equiv./g.

On removing mixtures of HF and HCl from air under the conditions as in Example 8 hereinbefore, before HF breakthrough 2,300 l of the gas are purified and 275 mg of HF and 275 mg of HCl sorbed. After washing the filter with 100 ml of water 250 mg of HF and 40 mg of HCl are washed out. During repeated purification of air with the regenerated filter under the same conditions prior to HCl breakthrough 1,280 l of the gas are purified and as a result of the repeated regeneration of the filter, 150 mg of HF and 145 mg of HCl are washed out. In subsequent cycles similar results are obtained.

EXAMPLE 12

The fiber is formed from an 18% solution of polyvinyl chloride in dimethylformamide according to the procedure described in the foregoing Example 10. Into the spinning solution 30% (by weight of the polymer) of polyethyleneimine are charged. The resulting fiber contains 20% by weight of polyethyleneimine and has an exchange capacity of 1.45 mg.-equiv./g.

In the process of removal of HF from air under the conditions described in the foregoing Example 9 to the point of HF breakthrough 8.5 m$^3$ of air are passed and 255 mg of HF sorbed.

Upon aqueous regeneration of the filter with 100 ml of water there are washed-out 115 mg of HF. In subsequent cycles under the same conditions there are purified about 4 m³ of the air and about 120 mg of HF are sorbed.

EXAMPLE 13

The fiber in this Example is formed from a 18% solution of a copolymer of vinylidene fluoride and tetrafluoroethylene in acetone. Into the spinning solution 40% (by weight of the copolymer) of polyethyleneimine are added. As the settling agent hexane is used. The thus-manufactured fiber is drawn in stream. The fiber contains 30% by weight of polyethyleneimine; it has an exchange capacity of 2.2 mg-equiv/g, tenacity of 14 gf/tex, elongation of 26%.

5 g of the resulting fiber are placed into a column with the diameter of 25 mm. The fiber bed height is 80 mm.

Air containing 1.2 g HCl/m³ in the form of gaseous hydrogen chloride and a mist of hydrochloric acid at a temperature of 20° C. is passed through the column at a rate of 3 l/min. Air drag of the fiber bed is 90 mm of water column.

Before HCl breakthrough the filter bed (5 mg/m³) 1,100 l of gas are passed and 1.32 g of HCl are sorbed. Upon washing of the column with 100 ml of water 0.95 g of HCl are washed-out. In subsequent cycles about 800 l of air having the same composition are purified and about 0.95 g of HCl (19% by weight of the sorbent) is sorbed in each cycle.

The degree of air purification is above 99.5%.

EXAMPLE 14

Under the conditions similar to those described in the foregoing Example 2, except that the relative air humidity is 30%, before HF breakthrough 1,700 l of air are passed and 340 mg of HF sorbed. Upon aqueous regeneration 190 mg of HF are washed-out. In subsequent cycles under the same conditions about 900–1,000 l of air are purified in each cycle, sorbing about 180–200 mg of HF (6–7% by weight of the sorbent.)

What is claimed is:

1. A process for the removal of acidic gases selected from the group consisting of hydrogen fluoride and hydrogen chloride, comprising passing the gas being treated through an anion-exchange sorbent composed of a textured chemisorption fiber comprising polymers selected from the group consisting of carbo-chain polymers with aliphatic amino groups and carbo-chain polymers with vinylpyridine groups, followed by aqueous regeneration of the anion-exchange sorbent.

2. A process as claimed in claim 1, wherein the textured chemisorption fiber comprising carbo-chain polymers with vinylpyridine groups comprises a copolymer consisting of 50 to 80% by weight of acrylonitrile and 50 to 20% by weight of a vinylpyridine monomer selected from the group consisting of 2-vinylpyridine, 4-vinylpyridine and 2-methyl-5-vinylpyridine.

3. A process as claimed in claim 1, wherein the textured chemisorption fiber comprising carbo-chain polymers with vinylpyridine groups comprises 20 to 50% by weight of a halide-containing polymer of the vinyl series selected from the group consisting of polyvinylidene chloride, polyvinylidene fluoride and polyvinyl chloride, and 80 to 50% by weight of a polyvinylpyridine selected from the group consisting of poly-2-vinylpyridine, poly-4-vinylpyridine and poly-2-methyl-5-vinylpyridine.

4. A process as claimed in claim 1, wherein the textured chemisorption fiber comprising carbo-chain polymers with vinylpyridine groups comprises a copolymer consisting of 20 to 50% by weight of polypropylene and 80 to 50% by weight of a vinylpyridine monomer selected from the group consisting of 2-vinylpyridine, 4-vinylpyridine and 2-methyl-5-vinylpyridine.

5. A process as claimed in claim 1, wherein the textured chemisorption fiber comprising carbo-chain polymers with aliphatic amino groups comprises 20 to 60% by weight of a polyamine selected from the group consisting of polyethylene polyamine and polyethylene imine, and 80 to 40% by weight of a halide-containing polymer of the vinyl series selected from the group consisting of polyvinylidene chloride, polyvinylidene fluoride and a copolymer of vinylidene fluoride with tetrafluoroethylene.

* * * * *